(12) United States Patent
Akisada et al.

(10) Patent No.: US 11,635,811 B2
(45) Date of Patent: Apr. 25, 2023

(54) APPARATUS, METHOD AND STORAGE MEDIUM TO PROVIDE MAINTENANCE MANAGEMENT WITH ALTERED DISPLAY BASED ON A USER'S VISUAL LINE

(71) Applicant: Yokogawa Electric Corporation, Tokyo (JP)

(72) Inventors: Yukiyo Akisada, Tokyo (JP); Yasuki Sakurai, Tokyo (JP); Azusa Takenaka, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 17/457,672

(22) Filed: Dec. 6, 2021

(65) Prior Publication Data

US 2022/0206569 A1    Jun. 30, 2022

(30) Foreign Application Priority Data

Dec. 28, 2020    (JP) .............................. JP2020-218983

(51) Int. Cl.
*G06F 3/01*   (2006.01)
*G06F 3/14*   (2006.01)
*G06F 3/16*   (2006.01)
*G08B 3/10*   (2006.01)
*G08B 21/18*   (2006.01)

(52) U.S. Cl.
CPC ............... *G06F 3/013* (2013.01); *G06F 3/14* (2013.01); *G06F 3/165* (2013.01); *G08B 3/10* (2013.01); *G08B 21/18* (2013.01)

(58) Field of Classification Search
CPC . G06F 3/013; G06F 3/14; G06F 3/165; G06F 3/0304; G06F 3/04842; G08B 3/10; G08B 21/18; G05B 19/042; G05B 23/0267; H04N 7/18; G01D 21/02
See application file for complete search history.

(56) References Cited

U.S. PATENT DOCUMENTS

| | | | | |
|---|---|---|---|---|
| 7,532,197 | B2 * | 5/2009 | Clement | G06F 3/013 715/781 |
| 8,612,855 | B2 * | 12/2013 | Greenspan | G06F 3/01 715/702 |
| 2006/0007396 | A1 | 1/2006 | Clement | |

(Continued)

FOREIGN PATENT DOCUMENTS

| | | |
|---|---|---|
| JP | 2000222027 A | 8/2000 |
| JP | 2011198247 A | 10/2011 |
| JP | 2014067132 A | 4/2014 |

(Continued)

OTHER PUBLICATIONS

Extended European Search Report for European Patent Application No. 21216008.9, issued by the European Patent Office dated May 31, 2022.

(Continued)

*Primary Examiner* — Vijay Shankar

(57) ABSTRACT

Provided is an apparatus comprising: a determination unit configured to determine a first region to be viewed by a user in a display screen; a detection unit configured to detect a user's visual line; and a display control unit configured to change a display mode of the first region in response to the first region being not viewed.

20 Claims, 5 Drawing Sheets

(56) References Cited

U.S. PATENT DOCUMENTS

2012/0096398 A1    4/2012  Greenspan

FOREIGN PATENT DOCUMENTS

| | | |
|---|---|---|
| JP | 2016045723 A | 4/2016 |
| JP | 2018049258 A | 3/2018 |
| JP | 2020038336 A | 3/2020 |
| JP | 2020080154 A | 5/2020 |

OTHER PUBLICATIONS

Office Action issued for counterpart Japanese Application No. 2020-218983, issued by the Japanese Patent Office dated Jan. 24, 2023 (drafted on Jan. 18, 2023).

* cited by examiner

APPARATUS, METHOD AND STORAGE MEDIUM TO PROVIDE MAINTENANCE MANAGEMENT WITH ALTERED DISPLAY BASED ON A USER'S VISUAL LINE

The contents of the following Japanese patent application(s) are incorporated herein by reference:
2020-218983 filed in JP on Dec. 28, 2020

BACKGROUND

1. Technical Field

The present invention relates to an apparatus, a method, and a recording medium.

2. Related Art

Patent document 1 describes that "another gazed object may be enlarged and displayed based on the posture information of the student S".

PRIOR ART DOCUMENT

Patent Document

Patent document 1: Japanese Patent Application Publication No. 2020-80154.

SUMMARY

A first aspect of the present invention provides an apparatus. The apparatus may include a determination unit configured to determine a first region to be viewed by a user in a display screen. The apparatus may include a detection unit configured to detect a user's visual line. The apparatus may include a display control unit configured to change a display mode of the first region in response to the first region being not viewed.

A second aspect of the present invention provides a method. The method may include a determination step to determine a first region to be viewed by a user in a display screen. The method may include a detection step to detect a user's visual line. The method may include a display control step to change a display mode of the first region in response to the first region being not viewed.

A third aspect of the present invention provides a storage medium having stored thereon a program. The program may cause a computer to function as a determination unit configured to determine a first region to be viewed by a user in a display screen. The program may cause the computer to function as a detection unit configured to detect a user's visual line. The program may cause the computer to function as a display control unit configured to change a display mode of the first region in response to the first region being not viewed.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention, but the following embodiments do not limit the claimed invention. Moreover, not all combinations of features described in the embodiments are necessary to solutions of the invention.

1. Configuration of Maintenance Management System 1

Figure 1:
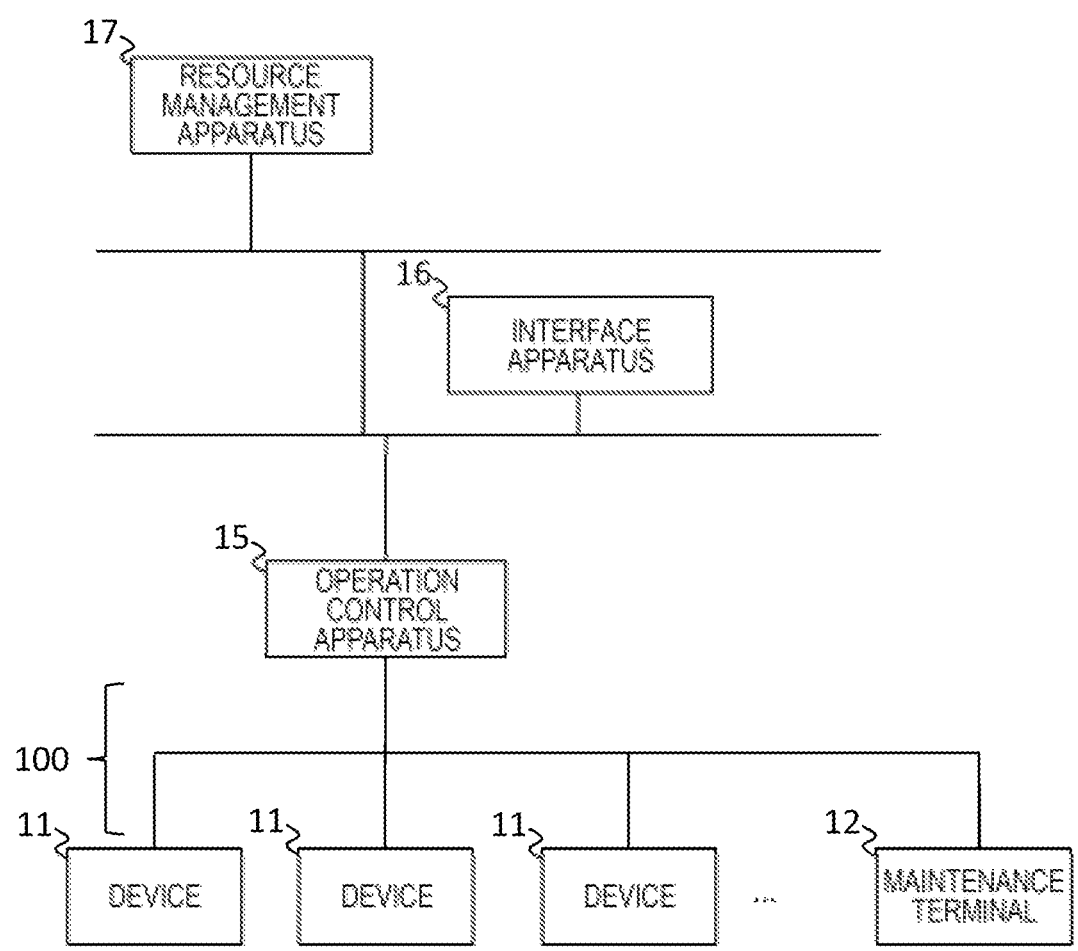
FIG. 1 shows a maintenance management system 1 according to this embodiment.

FIG. 1 shows a maintenance management system 1 according to this embodiment. The maintenance management system 1 performs maintenance management of a plant, and includes a plurality of devices 11, a maintenance terminal 12, an operation control apparatus 15, an interface apparatus 16, and a resource management apparatus 17.

Examples of the plant include not only an industrial plant such as a chemical plant but also a plant for managing and controlling a well site such as a gas field and an oil field and its surroundings, a plant for managing and controlling electric generation of hydraulic power, thermal power, nuclear power, or the like, a plant for managing and controlling energy harvesting from solar power, wind power, or the like, and a plant for managing and controlling water supply and sewerage, a dam, or the like, etc. Each device 11 and the maintenance terminal 12 may be arranged at a site where a process is executed in the plant. For example, there are piping for flowing fluid to be measured, a flowmeter installed in the piping to measure a flow rate of the fluid, and the like, at the site. The operation control apparatus 15, the interface apparatus 16, and the resource management apparatus 17 may be arranged in a management center of the plant.

1-1. Device 11

The plurality of devices 11 are instruments, machines, or apparatuses, and for example, they may be sensors for measuring a physical quantity such as a pressure, temperature, pH, speed, or flow rate in the process of the plant, or may be an actuator such as a valve for controlling any physical quantity, a flow control valve, an on-off valve, a pump, a fan, a motor, a heating apparatus, or a cooling apparatus, or may be an acoustic device such as a microphone or a speaker for collecting an abnormal noise in the plant and the like or emitting an alarm sound and the like, or may be a position detection device for outputting position information of each device, or may be piping for flowing fluid, or may be another device. Each device 11 among the plurality of devices 11 may be of type different from the others, or at least some, two or more of the devices 11 may be of the same types.

Each device 11 may be connected to the operation control apparatus 15 by wire or wirelessly via the control network 100. Communication in the control network 100 may be digital communication or may be hybrid communication in which a digital signal is superimposed on an analog signal (4 to 20 mA signal or the like), and may be at a speed of around 1000 bps to 10000 bps (1200 bps, 2400 bps, as an example). The communication in the control network 100 may be performed by a wireless communication protocol of, for example, ISA (International Society of Automation), and may be performed by, as an example, ISA100, HART (Highway Addressable Remote Transducer) (registered trademark), BRAIN (registered trademark), FOUNDATION Fieldbus, PROFIBUS, or the like.

Each device 11 may have specific identification information (also referred to as "device-specific information"). The device-specific information is information for uniquely identifying a device, and as an example in this embodiment, it may be at least one of a serial number given to the device 11 by a communication protocol (HART, as an example), a serial number set by a manufacturer of the device 11, or a device ID.

1-2. Maintenance Terminal 12

The maintenance terminal 12 accesses a setting parameter of the device 11, and refers to, sets, and changes a value of the setting parameter, etc. The maintenance terminal 12 may be a handheld terminal (HHT) (a smartphone or a tablet PC, as an example) carried by a site worker, or may be a stationary PC. If the maintenance terminal 12 is the handheld terminal, the maintenance terminal 12 may be detachably connected to the device 11.

1-3. Operation Control Apparatus 15

The operation control apparatus 15 communicates with each device 11 to control the process. For example, the operation control apparatus 15 acquires a process value, which is measurement data, from the device 11, which is a sensor, and activates the device 11, which is an actuator. Then, the operation control apparatus 15 may supply the process value to the interface apparatus 16, and receive a target value of the process value from the interface apparatus 16. Note that, as an example in this embodiment, description will be made assuming that the maintenance management system 1 is provided with one operation control apparatus 15 to control all the devices 11, but the maintenance management system 1 may be provided with a plurality of operation control apparatuses 15, each of which performs distributed control over some of the devices 11. The operation control apparatus 15 may be an FCS (Field Control Station) as an example.

1-4. Interface Apparatus 16

The interface apparatus 16 is an example of the apparatus, and displays various data in the plant on a display screen, to interface between a manager and the plant. The interface apparatus 16 may control the process of the plant via the operation control apparatus 15 in response to operation by the manager. For example, the interface apparatus 16 may receive the process value from the operation control apparatus 15, and supply the target value of the process value to the operation control apparatus 15. Moreover, the interface apparatus 16 may change the value of the setting parameter of the device 11 via the operation control apparatus 15. Moreover, the interface apparatus 16 may store, in association with at least some of the devices 11, the values of the setting parameters of those devices 11. The interface apparatus 16 may be an HIS (Human Interface Station) as an example, and may be composed of a PC or the like.

1-5. Resource Management Apparatus 17

The resource management apparatus 17 performs online monitoring and centralized management of the plant. For example, the resource management apparatus 17 may manage data (the value of the setting parameter, and the process value, as an example) on the device 11 acquired by the operation control apparatus 15, or the like. The resource management apparatus 17 may be composed of a PC or the like, as an example.

2. Interface Apparatus 16

Figure 2:
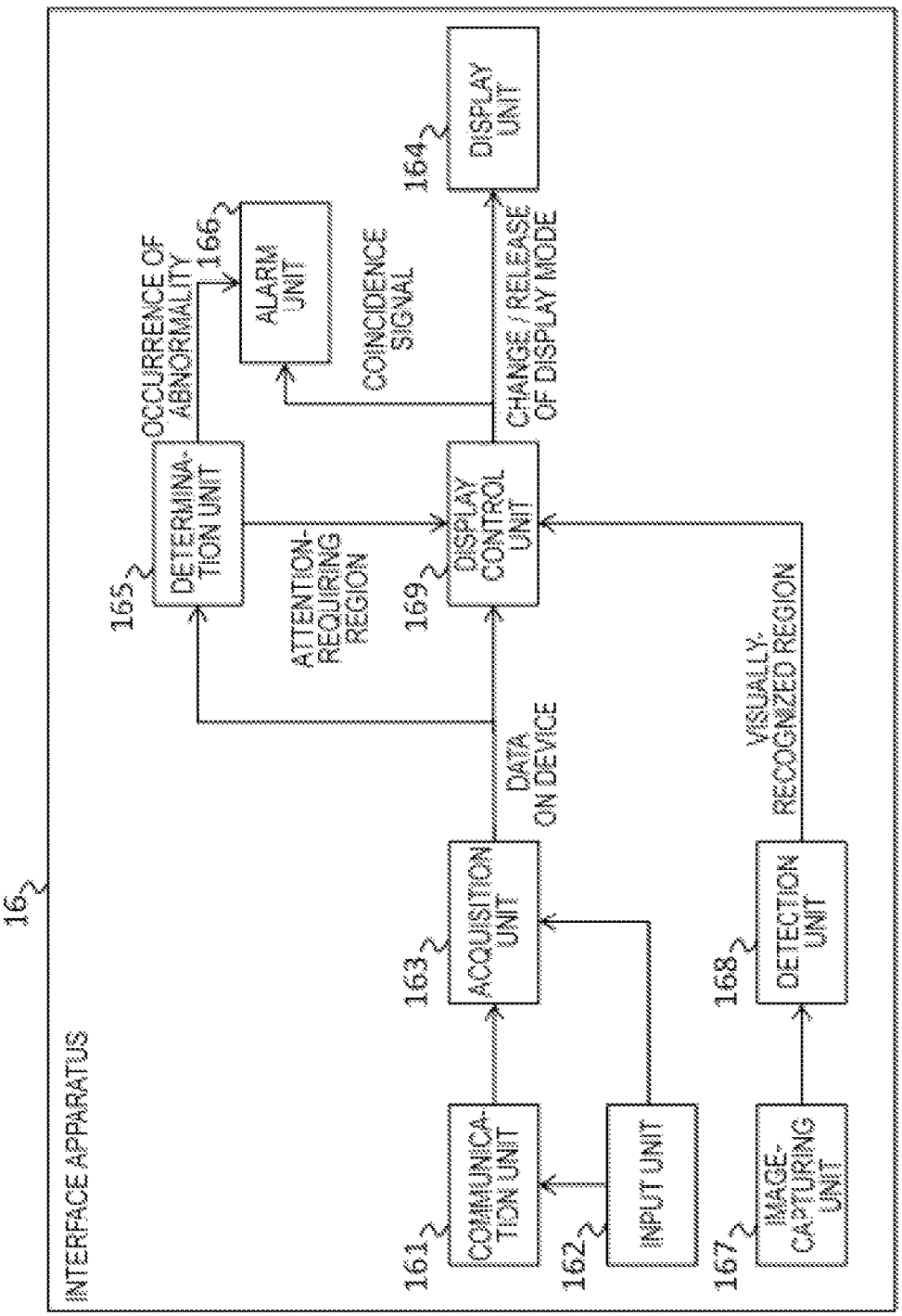
FIG. 2 shows an interface apparatus 16.

FIG. 2 shows the interface apparatus 16. The interface apparatus 16 has a communication unit 161, an input unit 162, an acquisition unit 163, a display unit 164, a determination unit 165, an alarm unit 166, an image-capturing unit 167, a detection unit 168, and a display control unit 169.

2.1. Communication Unit 161

The communication unit 161 wirelessly communicates with the operation control apparatus 15, the resource management apparatus 17, and the like. The communication unit 161 may supply received data (a process value, and a value of a setting parameter, as an example) to the acquisition unit 163.

2.2. Input Unit 162

The input unit 162 receives input from a user. For example, the input unit 162 may be inputted with various data (a target value of the process value, as an example). The input unit 162 may supply input contents to the acquisition unit 163. Moreover, the input unit 162 may cause the input contents to be transmitted from the communication unit 161 to the operation control apparatus 15 or the resource management apparatus 17.

2.3. Acquisition Unit 163

The acquisition unit 163 acquires data about the plurality of devices 11 existing in the plant. As an example in this embodiment, the acquisition unit 163 may acquire the process value, the target value thereof, and the value of the setting parameter via the communication unit 161 and the input unit 162. The acquisition unit 163 may supply the acquired data to the display control unit 169, to cause the display unit 164 to display the data. Moreover, the acquisition unit 163 may supply the acquired data to the determination unit 165.

2.4. Display Unit 164

The display unit 164 has one or more display screens, and displays the data about the plurality of devices 11 on a plurality of regions in the display screen. Each region may be a region surrounded by a coordinate range in the display screen, or may be a window set in the display screen.

Display contents and a display mode of the display screen may be controlled by the display control unit 169. For example, the display screen may display various data (the process value, and the value of the setting parameter, as an example) in the plant, supplied via the display control unit 169. The display mode controlled by the display control unit 169 may be at least one of a display position, a display color, brightness, or a display size of each region, as an example. Additionally or alternatively, the display mode controlled by the display control unit 169 may be at least one of character decoration, a display color, or a display size of a text in each region.

Note that the display position of the region may be a vertical position or a horizontal position in the display screen, or may be a position in a depth direction (also referred to as Z-order or Z-index). The display color of the region may be a background color, or may be a color of a frame surrounding the region. The character decoration of the text may be bold and underline, marker (also referred to as highlight), half-tone dot meshing, or the like.

2.5. Determination Unit 165

The determination unit 165 determines a first region (also referred to as an attention-requiring region) to be viewed by the user in the display screen. The determination unit 165 may determine, as the attention-requiring region, a region displaying the data to be checked by the user. For example, the determination unit 165 may determine, in response to occurrence of an abnormality in any data (the process value, as an example in this embodiment) acquired by the acquisition unit 163, a display region of that data as the attention-requiring region. The determination unit 165 may supply region data indicating the attention-requiring region to the display control unit 169. Moreover, the determination unit 165 may supply, to the alarm unit 166, a signal (also referred to as an abnormal signal) indicating the occurrence of the abnormality in the data.

Then, the attention-requiring region may be the region surrounded by the coordinate range in the display screen. In this case, the region data on the attention-requiring region may indicate the coordinate range in the display screen. Moreover, when a plurality of windows are set in the display screen, the attention-requiring region may be any of the windows. In this case, the region data on the attention-requiring region may indicate the coordinate range in the display screen, or may indicate any of the windows.

2.6. Alarm Unit 166

The alarm unit 166 emits the alarm sound in response to the occurrence of an abnormality in any data (the process value, as an example in this embodiment) acquired by the acquisition unit 163.

2.7. Image-Capturing Unit 167

The image-capturing unit 167 captures an image of a user's eyeball. The image-capturing unit 167 may supply the captured image of the eyeball to the detection unit 168. Note that, as an example in this embodiment, the image-capturing unit 167 is provided on an outer peripheral portion of the display screen of the display unit 164, but the image-capturing unit 167 may be provided at another position.

2.8. Detection Unit 168

The detection unit 168 detects a user's visual line. The detection unit 168 may detect the visual line by analyzing the image of the eyeball supplied from the image-capturing unit 167. The detection unit 168 may detect a gaze position of the eyes from the image of the eyeball, and detect, as the user's visual line, a straight line connecting a midpoint between the eyes and the user's gaze position.

The detection unit 168 may further detect a second region (also referred to as a visually-recognized region) viewed by the user in the display screen. For example, the detection unit 168 may detect an intersection between the user's visual line and the display screen as a position viewed by the user in the display screen, and detect a region including this position as the visually-recognized region. The detection unit 168 may supply, to the display control unit 169, region data indicating the visually-recognized region.

Then, the visually-recognized region may be the region surrounded by the coordinate range in the display screen. In this case, the region data on the visually-recognized region may indicate the coordinate range in the display screen. Moreover, when a plurality of windows are displayed in the display screen, the visually-recognized region may be any of the windows. In this case, the region data on the visually-recognized region may indicate the coordinate range in the display screen, or may indicate any of the windows. As an example in this embodiment, the visually-recognized region is a region smaller than the attention-requiring region, but it may be a region as large as the attention-requiring region, or may be a region larger than the attention-requiring region.

2.9. Display Control Unit 169

The display control unit 169 controls the display unit 164. The display control unit 169 may cause the display unit 164 to display the data supplied from the acquisition unit 163.

When the data indicating the attention-requiring region to be viewed by the user is supplied from the determination unit 165, the display control unit 169 changes a display mode of the attention-requiring region in response to the attention-requiring region being not viewed by the user. The display control unit 169 may change the display mode of the attention-requiring region in response to a difference between the attention-requiring region to be viewed by the user and the visually-recognized region viewed by the user.

Changing the display mode may mean changing at least one of a display position, a display color, brightness, or a display size of the attention-requiring region. Additionally or alternatively, changing the display mode may mean changing at least one of character decoration, a display color, or a display size of a text in the attention-requiring region.

When the display mode of the attention-requiring region has been changed, the display control unit 169 may restore the display mode of the attention-requiring region to its state before change in response to a coincidence between the attention-requiring region and the visually-recognized region. Moreover, in response to the coincidence between the attention-requiring region and the visually-recognized region, the display control unit 169 may supply, to the alarm unit 166, a signal indicating the coincidence (also referred to as a coincidence signal). Note that the coincidence between the attention-requiring region and the visually-recognized region may mean that the visually-recognized region coincides with at least a part of the attention-requiring region, in other words, it may mean that the visually-recognized region is included in the attention-requiring region.

According to the above-described interface apparatus 16, the display mode of the attention-requiring region is changed in response to the fact that the attention-requiring region to be viewed by the user in the display screen is not viewed, so that a user's attention can be drawn to guide his/her visual line to the attention-requiring region.

Moreover, the visually-recognized region viewed by the user in the display screen is detected, and the display mode of the attention-requiring region is changed in response to the difference between that visually-recognized region and the attention-requiring region to be viewed by the user. Therefore, when the attention-requiring region is not viewed by the user, it can be ensured that his/her visual line is guided to the attention-requiring region.

Moreover, the display mode of the attention-requiring region is restored to its state before change in response to the coincidence between the attention-requiring region and the visually-recognized region, so that the user can be informed that the region viewed by the user is correct. Moreover, when the attention-requiring region is sequentially switched to another region, the display mode of the past attention-requiring region does not remain changed, so that his/her visual line can be guided to a new attention-requiring region each time.

Moreover, at least one of the display position of the attention-requiring region, the display color of the attention-requiring region, the brightness of the attention-requiring region, the display size of the attention-requiring region, the character decoration of the text in the attention-requiring region, the display color of the text in the attention-requiring region, or the display size of the text in the attention-requiring region is changed, so that it can be ensured that the user's attention is drawn to guide his/her visual line to the attention-requiring region.

Moreover, in response to the occurrence of an abnormality in any of the data on the plurality of devices existing in the plant, the display region of that data is determined as the attention-requiring region, so that the user can be informed of the abnormality of the plant at an early stage.

3. Operation of Interface Apparatus 16

Figure 3:
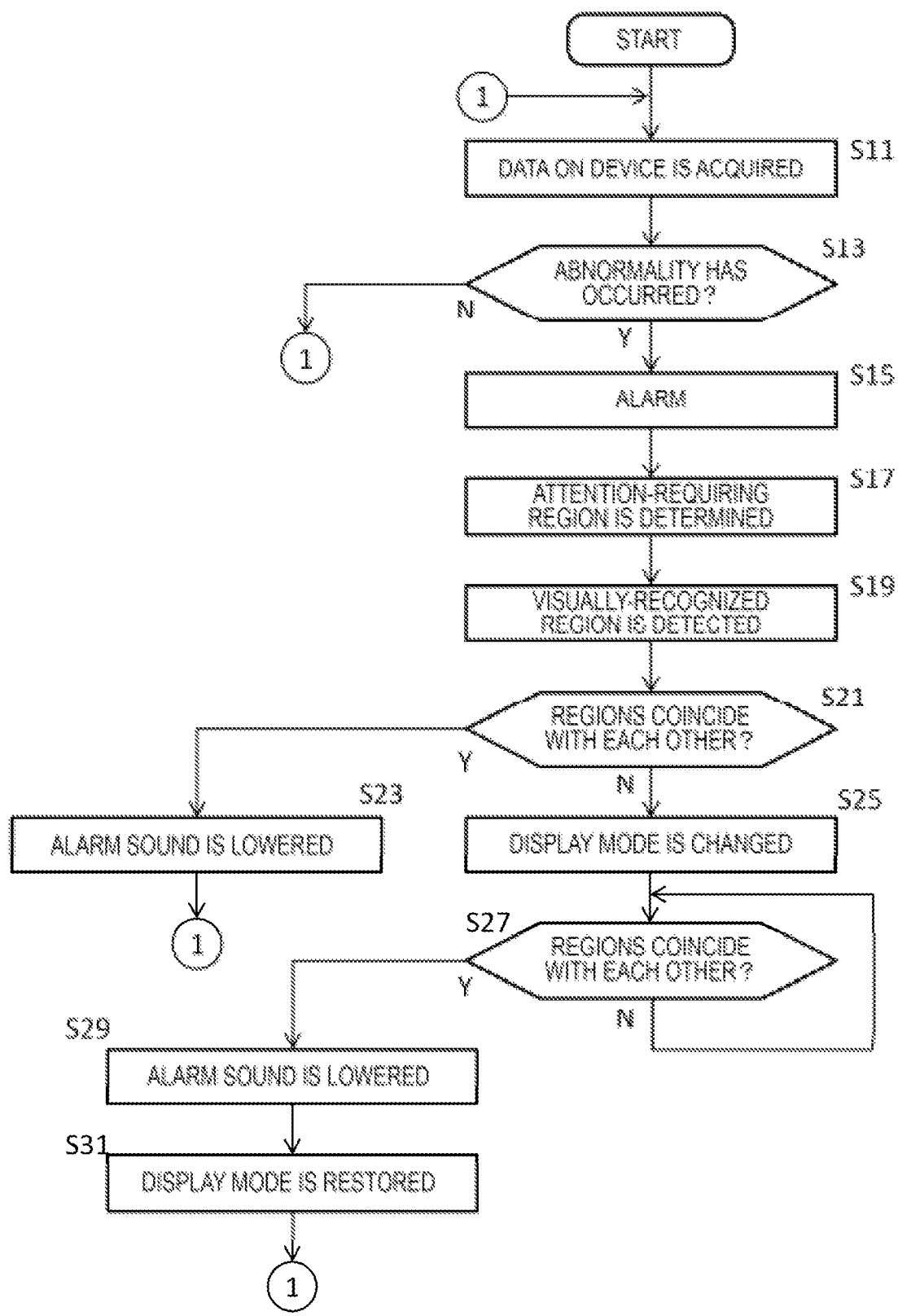
FIG. 3 shows operation of the interface apparatus 16.

FIG. 3 shows operation of the interface apparatus 16. The interface apparatus 16 supports the maintenance management of the plant by performing processing of steps S11 to S31. Note that this operation may be started in response to a start-up of the plant.

In step S11, the acquisition unit 163 acquires data about the plurality of devices 11 existing in the plant.

In step S13, the determination unit 165 determines whether an abnormality has occurred in any data (a process value, as an example in this embodiment) acquired by the acquisition unit 163. If it is determined that an abnormality has occurred (step S13; Y), the processing may shift to step S15. If it is determined that no abnormality occurs (step S13; N), the processing may shift to step S11. Note that, at this time, the alarm unit 166 may terminate generation of an alarm sound if it has already emitted the alarm sound through the processing of step S15 described later.

In step S15, the alarm unit 166 emits the alarm sound. The alarm sound may be emitted continuously. If the alarm sound has been already emitted, the alarm unit 166 may emit the alarm sound while maintaining a current volume. For example, if the alarm sound has been lowered through the processing of step S23 or step S29 described later, the alarm unit 166 may emit the alarm sound while maintaining the lowered volume. The alarm unit 166 may include, in the alarm sound, a device ID of the device 11 on which the abnormality has occurred in the data.

In step S17, the determination unit 165 determines an attention-requiring region to be viewed by a user in the display screen. The determination unit 165 may determine a single attention-requiring region, or may determine a plurality of attention-requiring regions.

The determination unit 165 may determine, in response to occurrence of an abnormality in any data (the process value, as an example in this embodiment) acquired by the acquisition unit 163, a display region of that data as the attention-requiring region. As an example in this embodiment, the determination unit 165 may store an allowable range of a possible value for each data, and may assume, in response to any data being out of the allowable range, that an abnormality has occurred in that data. Additionally or alternatively, the determination unit 165 may assume, in response to any data being not supplied from the acquisition unit 163, that an abnormality has occurred in that data.

In step S19, the detection unit 168 detects a user's visual line. As an example in this embodiment, the detection unit 168 may further detect a visually-recognized region viewed by the user in the display screen.

In step S21, the display control unit 169 determines whether the attention-requiring region is viewed. As an example in this embodiment, the display control unit 169 may determine whether the attention-requiring region and the visually-recognized region coincide with each other. If it is determined that the attention-requiring region and the visually-recognized region coincide with each other (step S21; Y), the processing may shift to step S23. If it is determined that the attention-requiring region and the visually-recognized region do not coincide with each other (step S21; N), the processing may shift to step S25.

As an example in this embodiment, the fact that the attention-requiring region is viewed may mean that the attention-requiring region is viewed at least once in a first reference time width (1 minute, as an example) up to the present time. The fact that the attention-requiring region is viewed once may mean that a state in which the visual line is located in the attention-requiring region continues for a second reference time width (0.5 seconds, as an example).

Note that, when there are a plurality of attention-requiring regions, the display control unit 169 may determine whether each of the plurality of attention-requiring regions is viewed. The fact that each of the plurality of attention-requiring regions is viewed may mean that each attention-requiring region is viewed at least once in the first reference time width up to the present time.

In step S23, the alarm unit 166 sets a volume of the alarm sound smaller than a reference volume in response to receiving, from the display control unit 169, a coincidence signal indicating that the attention-requiring region and the visually-recognized region coincide with each other. The reference volume may be a volume (70 dB, as an example) that does not defocus the user. If the alarm sound has been already lowered through the processing of step S23 or step S29 described later, the alarm unit 166 may further lower the alarm sound, or may maintain the volume of the alarm sound. The alarm unit 166 may set the volume of the alarm sound to zero. When the processing of step S23 is terminated, the processing may shift to step S11.

In step S25, the display control unit 169 changes a display mode of the attention-requiring region. When there are a plurality of attention-requiring regions and at least one of the attention-requiring regions is not viewed in the processing of step S21, the display control unit 169 may change the display modes of all the attention-requiring regions.

In step S27, the display control unit 169 determines whether the attention-requiring region is viewed. As an example in this embodiment, the display control unit 169 may determine, as in step S21, whether the attention-requiring region and the visually-recognized region coincide with each other. However, in the processing of step S27, the display control unit 169 may determine whether the attention-requiring region and the visually-recognized region coincide with each other between the processing of step S21 and the present time.

If it is determined that the attention-requiring region and the visually-recognized region do not coincide with each other (step S27; N), the processing may shift to step S27. If it is determined that the attention-requiring region and the visually-recognized region coincide with each other (step S27; Y), the processing may shift to step S29.

In step S29, the alarm unit 166 lowers the alarm sound in response to receiving, from the display control unit 169, the coincidence signal indicating that the attention-requiring region and the visually-recognized region coincide with each other, as in step S23.

In step S31, the display control unit 169 may restore the display mode of the attention-requiring region to its state before change. When there are a plurality of attention-requiring regions, the display control unit 169 may restore the display modes of all the attention-requiring regions. When the processing of step S31 is terminated, the processing may shift to step S11.

According to the above-described operation, the alarm sound is emitted in response to the occurrence of an abnormality in any data, and the volume of the alarm sound is set smaller than the reference volume in response to the attention-requiring region being viewed. Therefore, it can be prevented that the alarm sound defocuses the user.

4. Example of Display

Figure 4:
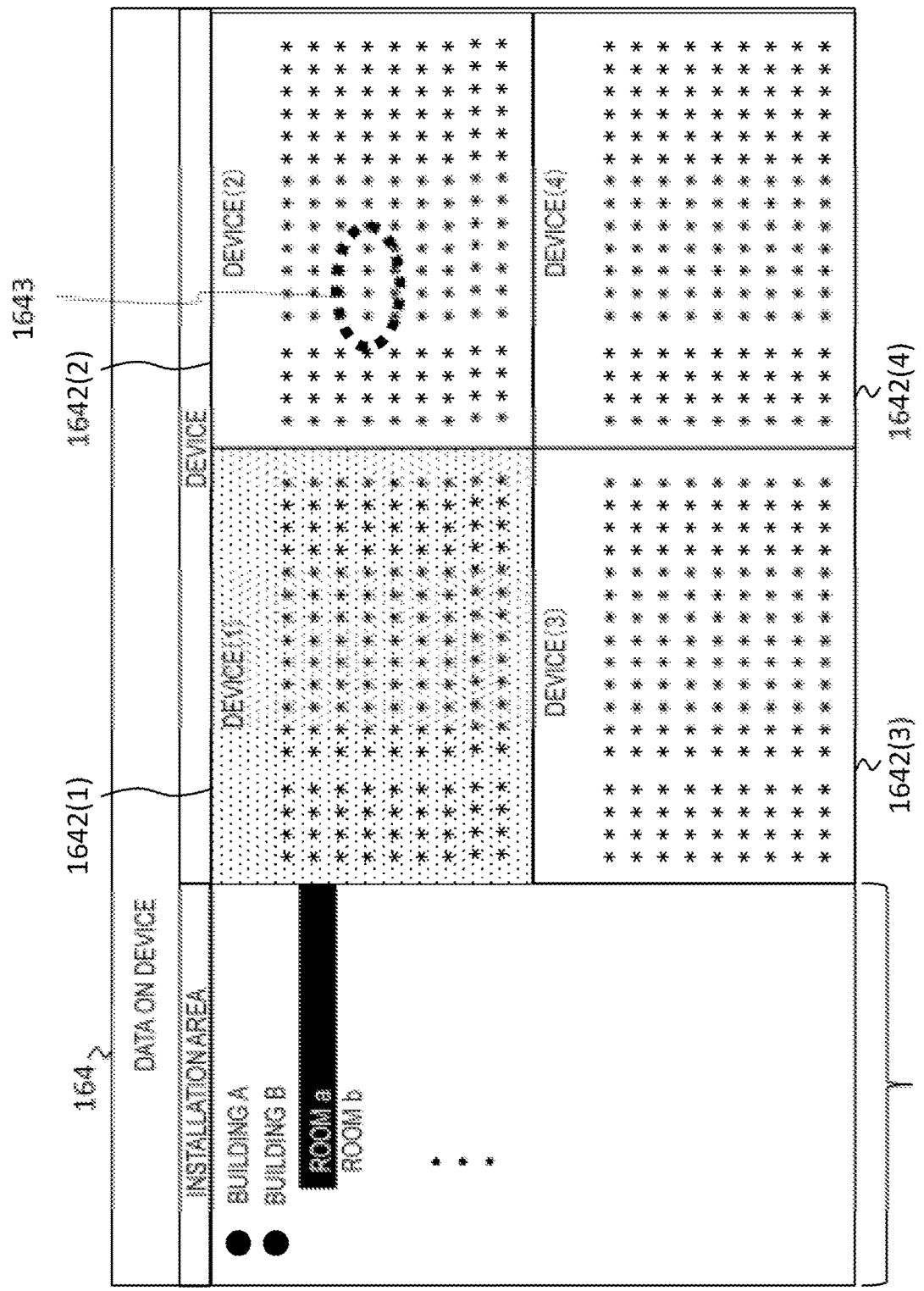
FIG. 4 shows a display screen of a display unit 164.

FIG. 4 shows the display screen of the display unit 164.

The display screen may display process values of some of the devices 11 selected by a user among respective devices 11 in the plant. For example, the display screen may be provided with an installation area selecting region 1641 for selecting an installation area of the device 11 in the plant, and a data display region 1642 for displaying a process value of each device 11 belonging to the selected installation area. Moreover, if an abnormality has occurred in the process value of any device 11, and another region is viewed by the user, a display mode of the data display region 1642 of that process value may be changed.

As an example in this figure, the installation area selecting region 1641 displays buildings and rooms in the plant as options for the installation area of the device 11, where "Room a" of "Building B" is selected, and the data display regions 1642 (1) to 1642 (4) display histories of the process values of "Device (1)" to "Device (4)" installed in that installation area. Moreover, the region 1643 visually recognized by the user is located in the data display region 1642 (2) while an abnormality has occurred in the process value of "Device (1)", whose data display region 1642 (1) is determined as an attention-requiring region, so that a background color of the data display region 1642 (1) has been changed.

Note that, if an abnormality has occurred in the process value of the device 11 in an unselected installation area, the display mode of the installation area corresponding to the device 11 for which the abnormality has occurred among the installation areas in the installation area selecting region 1641 may be changed. In this case, the user can select, in the installation area selecting region 1641, the installation area whose display mode has been changed, thereby checking, on the display screen, the process value of the device 11 in which the abnormality has occurred.

5. Variation

In the above-described embodiment, the description has been made assuming that the interface apparatus 16 has the communication unit 161, the input unit 162, the acquisition unit 163, the display unit 164, the alarm unit 166, and the image-capturing unit 167, but the interface apparatus 16 may not have any of these. For example, if the interface apparatus 16 does not have the acquisition unit 163, the determination unit 165 may previously store, for each operation by a user, a display region (a region for displaying description of the next operation, as an example) corresponding to that operation, and may also determine, for each operation, a display region related to that operation as the attention-requiring region.

Moreover, the description has been made assuming the fact that the attention-requiring region is viewed means that the attention-requiring region is viewed at least once in a first reference time width (1 minute, as an example) up to the present time, but that fact may mean that the attention-requiring region is viewed at the present time.

Moreover, in the processing of step S25, the description has been made assuming that, when there are a plurality of attention-requiring regions and at least one of the attention-requiring regions is not viewed, the display modes of all the attention-requiring regions are changed, but the display mode of only the attention-requiring region that is not viewed may be changed. In this case, if it is determined in the processing of step S27 that each of the plurality of attention-requiring regions is not viewed, the display control unit 169 may restore the display mode of the attention-requiring region that has been already viewed among the plurality of attention-requiring regions, to its state before change.

Moreover, the description has been made assuming that the detection unit 168 detects a gaze position of the eyes from the image of the eyeball, and detect, as the visual line, a straight line connecting a midpoint between the eyes and the gaze position, but the visual line may be detected with another method. For example, when the image-capturing unit 167 captures an image of a user's head, the detection unit 168 may detect, as the visual line, a straight line passing through the midpoint between the eyes and heading toward the front of the head.

Moreover, the detection unit 168 may detect the visual line without using any captured image. In this case, the detection unit 168 may have a sensor group (not shown) for detecting the user's visual line or the gaze position of the eyes. The sensor group may include a six-axis sensor, a magnetic sensor, an electro-oculogram sensor, or the like mounted at the user's head (around the eye, as an example). The six-axis sensor may be a motion sensor (also referred to as an inertial sensor) having a three-axis acceleration sensor and a three-axis gyro (angular velocity) sensor, and may detect a direction of the user's head. The magnetic sensor may be, for example, a three-axis geomagnetic sensor. The electro-oculogram sensor may detect a direction of the eyeball by detecting a potential difference around the eye. The detection unit 168 may use these sensors to detect the visual line with a traditionally known method. For example, when the sensor group includes the six-axis sensor or the magnetic sensor, the detection unit 168 may detect the position of the midpoint between the eyes and the direction of the head, and detect, as the visual line, the straight line passing through the midpoint between the eyes and heading toward the front of the head. When the sensor group further includes the electro-oculogram sensor, it may detect the midpoint between the eyes and the gaze position of the eyes, and detect, as the visual line, the straight line connecting the midpoint between the eyes and the gaze position of the eyes.

Moreover, the description has been made assuming that the apparatus according to this embodiment is the interface apparatus 16, but the apparatus according to this embodiment may be the resource management apparatus 17 or the maintenance terminal 12. Moreover, as long as performing display to the user, the apparatus may be any other apparatus, and may be a head-mounted display as an example.

Moreover, various embodiments of the present invention may be described with reference to flowcharts and block diagrams, whose blocks may represent (1) steps of processes in which operations are executed or (2) units of apparatuses responsible for executing operations. Certain steps and units may be implemented by a dedicated circuit, a programmable circuit supplied together with a computer-readable instruction stored on a computer-readable medium, and/or a processor supplied together with the computer-readable instruction stored on the computer-readable medium. The dedicated circuit may include a digital and/or analog hardware circuit, and may include an integrated circuit (IC) and/or a discrete circuit. The programmable circuit may include a reconfigurable hardware circuit including a logical AND, a logical OR, a logical XOR, a logical NAND, a logical NOR, and other logical operations, as well as a memory element such as a flip-flop, a register, a field-programmable gate array (FPGA), a programmable logic array (PLA), or the like, etc.

The computer-readable medium may include any tangible device capable of storing an instruction to be executed by a suitable device, so that the computer-readable medium having stored thereon an instruction is provided with an article of manufacture including an instruction which may be executed in order to create a means to execute operations designated in the flowcharts or the block diagrams. Examples of the computer-readable medium may include an electronic storage medium, a magnetic storage medium, an optical storage medium, an electromagnetic storage medium, a semiconductor storage medium, and the like. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a BLU-RAY (registered trademark) disk, a memory stick, an integrated circuit card, and the like.

The computer-readable instruction may include an assembler instruction, an instruction-set-architecture (ISA) instruction, a machine instruction, a machine dependent instruction, a microcode, a firmware instruction, state-setting data, or either a source code or an object code written in any combination of one or more programming languages, including an object-oriented programming language such as Smalltalk (registered trademark), JAVA (registered trademark), C++, or the like, and a conventional procedural programming language such as a "C" programming language or a similar programming language.

The computer-readable instruction may be provided to a processor or a programmable circuit of a general-purpose computer, a special-purpose computer, or other programmable data processing apparatuses, locally or via a local area network (LAN), a wide area network (WAN) such as the Internet or the like, and the computer-readable instruction may be executed in order to create the means to execute the operations designated in the flowcharts or the block diagrams. Examples of the processor include a computer processor, a processing unit, a microprocessor, a digital signal processor, a controller, a microcontroller, and the like.

Figure 5:
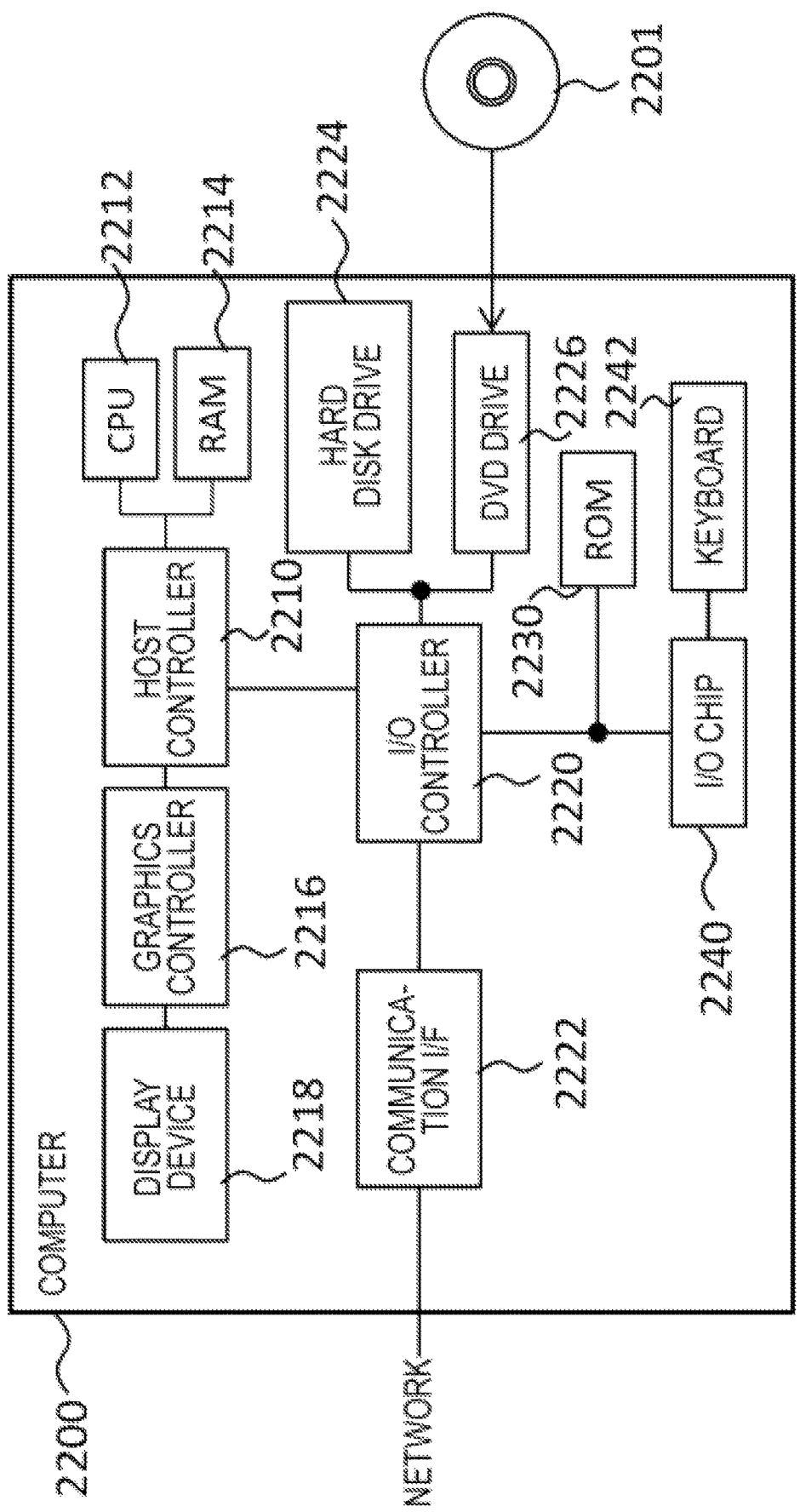
FIG. 5 shows an example of a computer 2200 in which a plurality of aspects of the present invention may be entirely or partially embodied.

FIG. 5 shows an example of a computer 2200 in which a plurality of aspects of the present invention may be entirely or partially embodied. A program installed in the computer 2200 can cause the computer 2200 to function as or execute an operation associated with the apparatus according to the embodiments of the present invention or one or more units of that apparatus, and/or can cause the computer 2200 to execute the process according to the embodiments of the present invention or steps of that process. Such a program may be executed by a CPU 2212 in order to cause the computer 2200 to execute a specific operation associated with some or all of the blocks of the flowcharts and the block diagrams described herein.

The computer 2200 according to this embodiment includes the CPU 2212, a RAM 2214, a graphics controller 2216, and a display device 2218, which are mutually connected by a host controller 2210. The computer 2200 also includes an input/output unit such as a communication interface 2222, a hard disk drive 2224, a DVD-ROM drive 2226, and an IC card drive, which are connected to the host controller 2210 via an input/output controller 2220. The computer also includes a legacy input/output unit such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphics controller 2216 acquires image data generated by the CPU 2212 on a frame buffer or the like provided in the RAM 2214 or in itself, such that the image data is displayed on the display device 2218.

The communication interface 2222 communicates with another electronic device via a network. The hard disk drive 2224 stores a program and data used by the CPU 2212 in the computer 2200. The DVD-ROM drive 2226 reads the program or the data from a DVD-ROM 2201, and provides the program or the data to the hard disk drive 2224 via the RAM 2214. The IC card drive reads the program and the data from an IC card, and/or writes the program and the data into the IC card.

The ROM 2230 stores therein a boot program or the like executed by the computer 2200 at the time of activation, and/or a program depending on a hardware of the computer 2200. The input/output chip 2240 may also connect various input/output units to the input/output controller 2220 via a parallel port, a serial port, a keyboard port, a mouse port, or the like.

A program is provided by a computer-readable medium such as the DVD-ROM 2201 or the IC card. The program is read from the computer-readable medium, is installed in the hard disk drive 2224, the RAM 2214, or the ROM 2230, which is also an example of the computer-readable medium, and is executed by the CPU 2212. Information processing written in these programs is read into the computer 2200, resulting in cooperation between a program and the above-described various types of hardware resources. An apparatus or a method may be constituted by realizing handling or processing of information in accordance with usage of the computer 2200.

For example, when communication is executed between the computer 2200 and an external device, the CPU 2212 may execute a communication program loaded onto the RAM 2214, and instruct the communication interface 2222 to process the communication based on the processing written in the communication program. Under control of the CPU 2212, the communication interface 2222 reads transmission data stored in a transmission buffering region provided in a recording medium such as the RAM 2214, the hard disk drive 2224, the DVD-ROM 2201, or the IC card, and transmits the read transmission data to the network, or writes reception data received from the network to a reception buffering region or the like provided on the recording medium.

Moreover, the CPU 2212 may cause all or a necessary portion of a file or a database to be read into the RAM 2214, the file and the database having been stored in an external recording medium such as the hard disk drive 2224, the DVD-ROM drive 2226 (DVD-ROM 2201), the IC card, or the like, and execute various types of processing on the data on the RAM 2214. The CPU 2212 then writes back the processed data to the external recording medium.

Various types of information such as various types of programs, data, tables, and databases may be stored in the recording medium, and undergo information processing. The CPU 2212 may execute, on the data read from the RAM 2214, various types of processing including various types of operations, information processing, conditional judgement, conditional branch, unconditional branch, information search/replacement, and the like as described throughout the present disclosure and designated by an instruction sequence of programs, and writes back the result to the RAM 2214. Moreover, the CPU 2212 may search for information in the file, the database, or the like in the recording medium. For example, when a plurality of entries each having an attribute value of a first attribute associated with an attribute value of a second attribute, are stored in the recording medium, the CPU 2212 may search for an entry matching a condition whose attribute value of the first attribute is designated, from among the plurality of entries, and read the attribute value of the second attribute stored in the entry, thereby acquiring the attribute value of the second attribute associated with the first attribute that satisfies a predetermined condition.

The program or the software module described above may be stored on the computer 2200 or in a computer-readable medium near the computer 2200. Moreover, a recording medium such as a hard disk or a RAM provided in a server system connected to a dedicated communication network or the Internet can be used as the computer-readable medium, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

1: maintenance management system
11: device
12: maintenance terminal
15: operation control apparatus
16: interface apparatus
17: resource management apparatus
100: control network
161: communication unit
162: input unit
163: acquisition unit
164: display unit
165: determination unit
166: alarm unit
167: image-capturing unit
168: detection unit
169: display control unit
2200: computer
2201: DVD-ROM
2210: host controller
2212: CPU
2214: RAM
2216: graphics controller
2218: display device
2220: input/output controller
2222: communication interface
2224: hard disk drive
2226: DVD-ROM drive
2230: ROM
2240: input/output chip
2242: keyboard

What is claimed is:

1. A maintenance management apparatus comprising:
   a determination unit configured to determine a first attention-requiring region and a second attention-requiring region to be viewed by a user in a display screen;
   a detection unit configured to detect a user's visual line coinciding with the second attention-requiring region; and
   a display control unit configured to change a display mode of the first attention-requiring region and not to change a display mode of the second attention-requiring region, in response to the first attention-requiring region being not viewed.

2. The maintenance management apparatus according to claim 1, wherein
   the display control unit is configured to change the display mode of the first attention-requiring region in response to a difference between the first attention-requiring region and the second attention-requiring region.

3. The maintenance management apparatus according to claim 2, wherein the display control unit is configured to restore the display mode of the first attention-requiring region to its state before change in response to a coincidence between the user's visual line and the first attention-requiring region.

4. The maintenance management apparatus according to claim 3, wherein the display control unit is configured to change at least one of a display position of the first attention-requiring region, a display color of the first attention-requiring region, brightness of the first attention-requiring region, a display size of the first attention-requiring region, character decoration of a text in the first attention-requiring region, a display color of the text in the first attention-requiring region, or a display size of the text in the first attention-requiring region.

5. The maintenance management apparatus according to claim 4, further comprising:
   an acquisition unit configured to acquire data about a plurality of devices existing in a plant; and a display unit configured to display data about a plurality of devices on a plurality of regions in the display screen, wherein the determination unit is configured to determine, in response to occurrence of an abnormality in any data acquired by the acquisition unit, a display region of the data in which the abnormality has occurred as the first attention-requiring region.

6. The maintenance management apparatus according to claim 5, further comprising an alarm unit configured to emit an alarm sound in response to the occurrence of the abnormality, wherein the alarm unit is configured to set a volume of the alarm sound smaller than a reference volume in response to the first attention-requiring region being viewed.

7. The maintenance management apparatus according to claim 3, further comprising:

an acquisition unit configured to acquire data about a plurality of devices existing in a plant; and a display unit configured to display data about a plurality of devices on a plurality of regions in the display screen, wherein the determination unit is configured to determine, in response to occurrence of an abnormality in any data acquired by the acquisition unit, a display region of the data in which the abnormality has occurred as the first attention-requiring region.

8. The maintenance management apparatus according to claim 7, further comprising an alarm unit configured to emit an alarm sound in response to the occurrence of the abnormality, wherein the alarm unit is configured to set a volume of the alarm sound smaller than a reference volume in response to the first attention-requiring region being viewed.

9. The maintenance management apparatus according to claim 2, wherein the display control unit is configured to change at least one of a display position of the first attention-requiring region, a display color of the first attention-requiring region, brightness of the first attention-requiring region, a display size of the first attention-requiring region, character decoration of a text in the first attention-requiring region, a display color of the text in the first attention-requiring region, or a display size of the text in the first attention-requiring region.

10. The maintenance management apparatus according to claim 9, further comprising:

an acquisition unit configured to acquire data about a plurality of devices existing in a plant; and a display unit configured to display data about a plurality of devices on a plurality of regions in the display screen, wherein the determination unit is configured to determine, in response to occurrence of an abnormality in any data acquired by the acquisition unit, a display region of the data in which the abnormality has occurred as the first attention-requiring region.

11. The maintenance management apparatus according to claim 10, further comprising an alarm unit configured to emit an alarm sound in response to the occurrence of the abnormality, wherein the alarm unit is configured to set a volume of the alarm sound smaller than a reference volume in response to the first attention-requiring region being viewed.

12. The maintenance management apparatus according to claim 2, further comprising:

an acquisition unit configured to acquire data about a plurality of devices existing in a plant; and a display unit configured to display data about a plurality of devices on a plurality of regions in the display screen, wherein the determination unit is configured to determine, in response to occurrence of an abnormality in any data acquired by the acquisition unit, a display region of the data in which the abnormality has occurred as the first attention-requiring region.

13. The maintenance management apparatus according to claim 12, further comprising an alarm unit configured to emit an alarm sound in response to the occurrence of the abnormality, wherein the alarm unit is configured to set a volume of the alarm sound smaller than a reference volume in response to the first attention-requiring region being viewed.

14. The maintenance management apparatus according to claim 1, wherein the display control unit is configured to change at least one of a display position of the first attention-requiring region, a display color of the first attention-requiring region, brightness of the first attention-requiring region, a display size of the first attention-requiring region, character decoration of a text in the first attention-requiring region, a display color of the text in the first attention-requiring region, or a display size of the text in the first attention-requiring region.

15. The maintenance management apparatus according to claim 14, further comprising:

an acquisition unit configured to acquire data about a plurality of devices existing in a plant; and a display unit configured to display data about a plurality of devices on a plurality of regions in the display screen, wherein the determination unit is configured to determine, in response to occurrence of an abnormality in any data acquired by the acquisition unit, a display region of the data in which the abnormality has occurred as the first attention-requiring region.

16. The maintenance management apparatus according to claim 15, further comprising an alarm unit configured to emit an alarm sound in response to the occurrence of the abnormality, wherein the alarm unit is configured to set a volume of the alarm sound smaller than a reference volume in response to the first attention-requiring region being viewed.

17. The maintenance management apparatus according to claim 1, further comprising:

an acquisition unit configured to acquire data about a plurality of devices existing in a plant; and a display unit configured to display data about a plurality of devices on a plurality of regions in the display screen, wherein the determination unit is configured to determine, in response to occurrence of an abnormality in any data acquired by the acquisition unit, a display region of the data in which the abnormality has occurred as the first attention-requiring region.

18. The maintenance management apparatus according to claim 17, further comprising an alarm unit configured to emit an alarm sound in response to the occurrence of the abnormality, wherein the alarm unit is configured to set a volume of the alarm sound smaller than a reference volume in response to the first attention-requiring region being viewed.

19. A maintenance management method comprising:

a determination step to determine a first attention-requiring region and a second attention-requiring region to be viewed by a user in a display screen;

a detection step to detect a user's visual line coinciding with the second attention-requiring region; and a display control step to change a display mode of the first attention-requiring region and not to change a display mode of the second attention-requiring region, in response to the first attention-requiring region being not viewed.

20. A non-transitory computer readable medium having stored thereon a program that causes a computer to function as:

a determination unit configured to determine a first attention-requiring region and a second attention-requiring region to be viewed by a user in a display screen;

a detection unit configured to detect a user's visual line coinciding with the second attention-requiring region; and a display control unit configured to change a display mode of the first attention-requiring region and not to change a display mode of the second attention-requiring region, in response to the first attention-requiring region being not viewed.

* * * * *